March 9, 1948. G. W. BENJAMIN 2,437,499
BELT CONVEYOR FRAME CONSTRUCTION
Filed Aug. 23, 1945 2 Sheets-Sheet 1
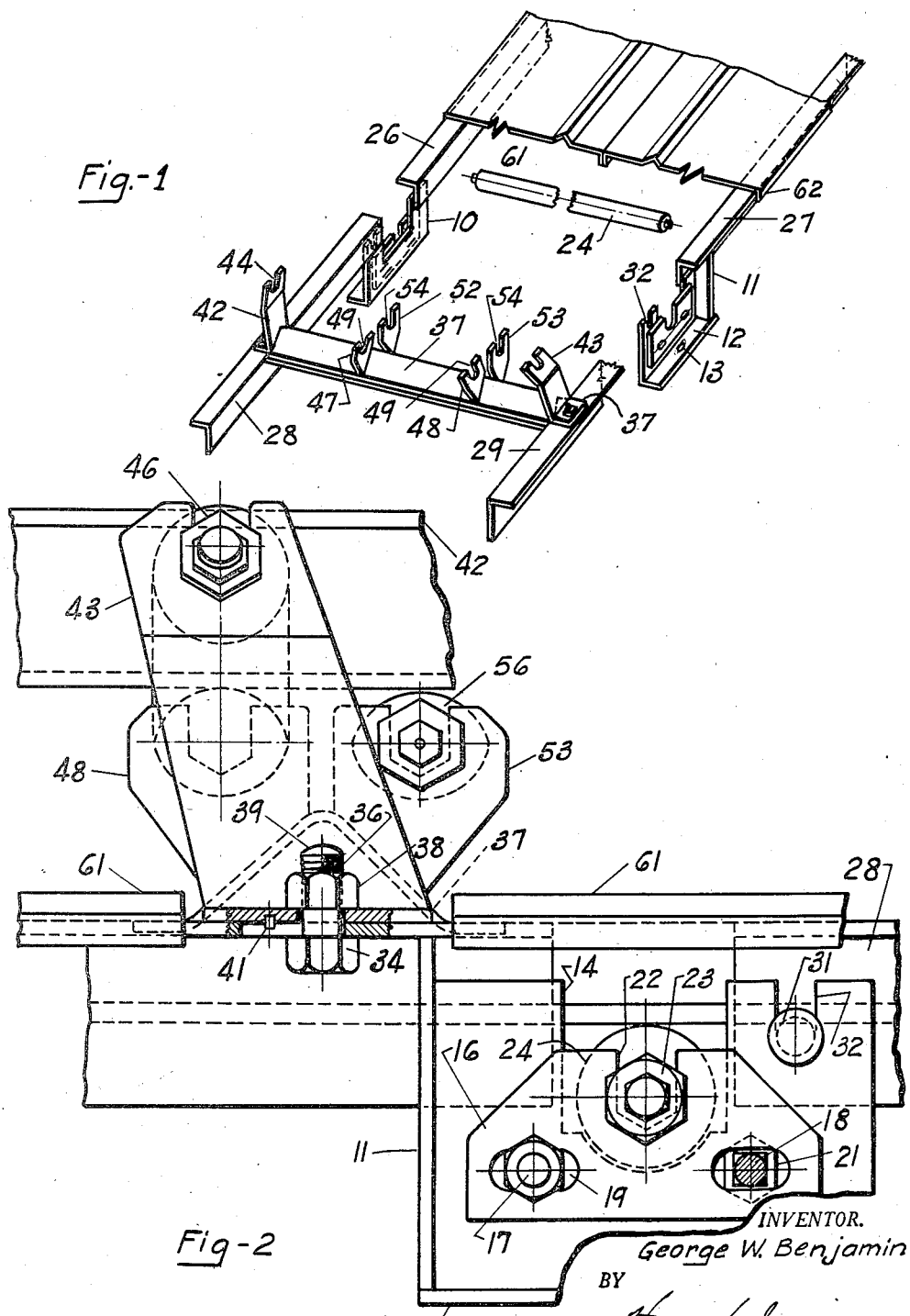
INVENTOR.
George W. Benjamin
BY
Henry L. Jennings
ATTORNEY

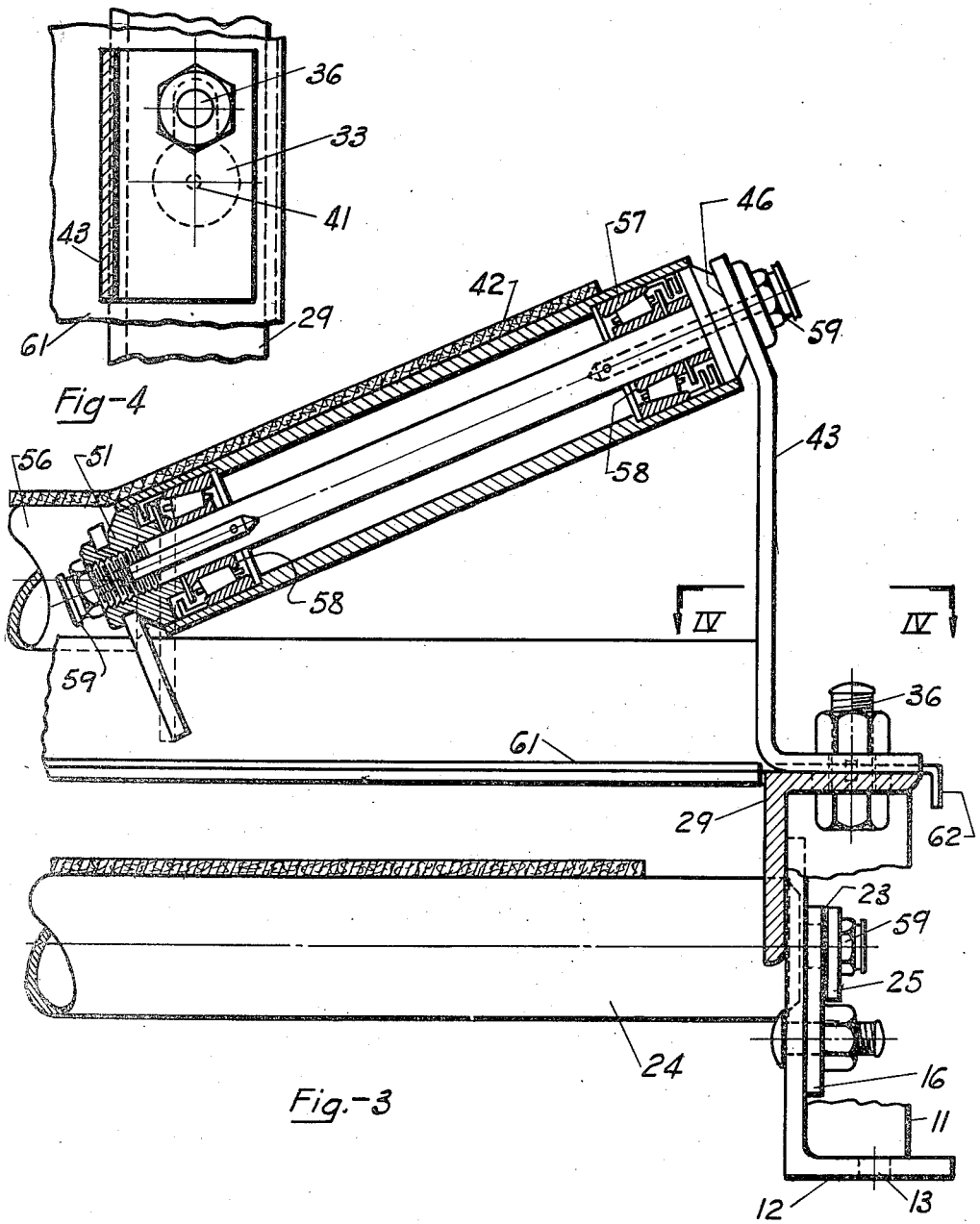

Patented Mar. 9, 1948

2,437,499

UNITED STATES PATENT OFFICE 2,437,499

BELT CONVEYOR FRAME CONSTRUCTION

George W. Benjamin, Birmingham, Ala., assignor to Continental Gin Company, a corporation of Delaware Application August 23, 1945, Serial No. 612,265

9 Claims. (Cl. 198—192)

This invention relates to conveyors of the endless belt type and particularly to the frame construction for supporting the idler rollers upon which the belt travels, and has for an object the provision of apparatus of the character designated which shall be simple of construction and be capable of being assembled and disassembled readily.

My invention is especially adapted for installation in mine workings with low head room so that the conveyor must be installed with men working in a crouched, or stooped position. A special feature of my invention resides in the fact that the parts of the supporting frame for the idler roller may be joined and fitted together snugly with the exertion of a minimum of manual effort. Included in this novel construction are side rails with supporting feet so designed that the idler supports may be readily attached to and detached therefrom, and when attached, form sturdy, lateral support for the entire structure.

Apparatus embodying features of my invention is illustrated in the accompanying drawings, forming a part of this application in which Fig. 1 is a schematic view of an intermediate section of my improved frame work for supporting the idler rollers;

Fig. 2 is a detail side elevational view showing the manner in which the side rails are connected to their vertical supports and the idler roller supports are connected to the side rails;

Fig. 3 is a fragmentary transverse sectional view; and

Fig. 4 is a detail sectional view taken along the line IV—IV of Fig. 3.

Inasmuch as my invention is concerned particularly with the intermediate sections of the conveyor, the head and tail pieces thereof are not shown, it being assumed that any standard design therefor may be employed. In the drawings, I show laterally opposed vertical supports 10 and 11, one on each side of a section, and each having a base 12 with an elongated slot 13 therein by means of which it may be anchored if desired. Each of the vertical members is provided with a relatively large opening 14 having parallel sides and each has secured thereto a plate 16 by means of bolts 17 and 18 passing through slotted holes 19 and 21. The ends of the bolts 17 and 18 are peened over so that the nuts may be loosened but will not come off. The plate 16 is provided with a notch 22 which is adapted to receive the hexagonal bearing end 23 of a return idler roller 24. The bearing end 23, as shown in Fig. 3, is provided with an overhanging flange 25 which engages the sides of the notch 22.

At 26 and 27, I show the side rails which are joined by welding to one side of the vertical supports 10 and 11. At 28 and 29 I show cooperating side rails, each of which is provided with a button head lug 31 which fits into a slot 32 provided in the other side of the vertical support 11. The side rails are preferably in the form of structural angles, as shown, with the button head connection on the vertical flange. The horizontal flange of each of the side rails, intermediate its ends, is provided with a key-hole shaped slot 33, the larger end of which is large enough to receive the head 34 of a bolt 36 which is adapted to secure a transverse idler support 37 to the rails 28 and 29. The narrow end of the slot is small enough to be engaged by the bolt head. In practice, the bolt 36 is provided with a nut 38 which is screwed on and the end peened over as shown at 39 so that the nut cannot be removed. Preferably the nut 38 is welded to support 37. The bolt 36 is made of sufficient length for the head to be passed through the keyhole slot and moved forward to the narrow portion thereof, as shown in Fig. 4, whereupon the bolt 36 is tightened. Also, the end of the support 37 is preferably provided with a small protuberance 41 which, when the parts are assembled, lies within the enlarged end of the key hole slot 33 and acts further to prevent the idler support 37 from becoming disengaged from the rails. As a further precaution, the narrow end of the key hole slot 33 is disposed in the direction of travel of the upper flight of the conveyor belt 42.

The idler support 37, as shown particularly in Fig. 2, is preferably angular in cross section and is provided at its ends with upwardly extending idler roller supports 42 and 43, each provided with a slot 44 having parallel sides and adapted to receive the hexagonal end 46 of an idler bearing support similar in all respects to the bearing support 23 carried by the return roller 24. The outer inclined troughing rollers are supported at their inner ends by means of relatively shorter supports 47 and 48, each of which is provided with a slot 49 similar to the slots 44 adapted to receive the hexagonal bearing end 51 of the other end of the roller. On the forward side of the idler support 37 I provide idler supports 52 and 53 each of which is provided with a notch 54, similar to the notch 49 which is adapted to receive the hexagonal end of a bearing support carried by the intermediate idler roller 56.

The bearings heretofore described for the idler rollers are conventional roller bearings each comprising an outer race 57 fitted into the roller, and an inner race 58 which extends outwardly of the roller and is provided with the flanged outer end heretofore described for fitting into the notch of the idler support. A grease fitting 59 is provided on each end whereby the bearings may be lubricated.

After the rails and supports have been assembled, as shown in Figs. 1 and 2, a sheet iron deck 61 is laid over the rails, between the upper and lower flights of the conveyor belt. The deck 61 is provided with down-turned flanges 62 which fit over the sides of the rails and the ends overhang the bases of the angular idler support 37, as shown in Fig. 2.

From the foregoing, it will be seen that my improved frame construction may be readily assembled with a minimum of manual labor. In the actual erection of a conveyor system, the head and tail pieces, not shown, are first located and the belt placed in position on said pieces. The intermediate construction which forms the feature of my invention being of small light parts may be placed separately on the upper flight of the belt and thus conveyed into the mine working. The rails 26 and 27 with their attached welded supports are positioned and the rails 28 and 29 attached thereto by means of the buttonhead rivets 31. The lower return idler 24 is then located in the notch 22 with the flange of the bearing support overhanging the sides of the notch. The idler support 37 is then placed in position on the top of the rails with the heads 34 of the bolts 36 placed down through the enlarged portions of the key hole slots whereupon they are moved forwardly and tightened down by means of the head 34. The rollers supporting the upper flight of the belt 42 are then placed in position in the support and the assembly of one section is completed. The remaining sections are assembled in the same manner until all the frame work is completed.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. A sectional belt conveyor frame construction comprising laterally opposed vertical supports each having a section of a longitudinally extending rail secured thereto and each having a pair of vertically opening notches therein, a meeting rail having a button head lug engaging in one of the notches, an idler roller terminating at both ends in button heads which engage in the other notches of said vertical supports, a support for idler troughing rollers extending transversely of the rails, bolts for detachably securing said support to the rails, the ends of the bolts being peened over to prevent the removal of nuts therefrom and there being key hole slots in the rails with openings at one end large enough to receive the bolts.

2. In a sectional belt conveyor construction, laterally opposed vertical supports, side rails detachably connected to the vertical supports and having key hole slots in the upper surfaces thereof, an idler roller support spanning the rails, bolts for connecting the support to the rails through the key hole slots and having heads thereon of a size small enough to pass through the large ends of said slots and large enough to engage the sides of the slots at the narrow ends thereof, the ends of said bolts being peened over to prevent removal of the nuts.

3. In a sectional belt conveyor construction, laterally opposed vertical supports having upwardly opening slots therein, side rails detachably connected to the vertical supports and having key hole slots in the upper surfaces thereof, an idler roller support spanning the rails, bolts for connecting the support to the rails through the key hole slots and having heads thereon of a size small enough to pass through the large ends of said slots and large enough to engage the sides of the slots at the narrow ends thereof, the ends of said bolts being peened over to prevent removal of the nuts, and a return idler assembly spanning the vertical supports with its ends resting in the upwardly opening slots provided in said supports, and flanges on the said assembly engaging the sides of said slots and holding the supports in spaced relation.

4. In an intermediate section of a sectional belt conveyor construction, a pair of parallel longitudinally extending rails having keyhole slots in the upper surfaces thereof, a vertical support joined to one end of each rail and having a slot in the upper edge thereof, a pair of meeting rails each with a button head lug hooked into the slot of its associated support, a plate adjustably mounted on and forming a part of each support and having a slot in the upper edge thereof disposed at a lower level than the rails, an idler assembly spanning the supports, and flanges on the assembly engaging the sides of the slots in the plates.

5. In an intermediate section of a sectional belt conveyor construction, a pair of parallel longitudinally extending rails having key hole slots in the upper surfaces thereof, a vertical support joined to one end of each rail and having a slot in the upper edge thereof, a pair of meeting rails each with a button head lug hooked into the slot of its associated support, a plate adjustably mounted on and forming a part of each support and having a slot in the upper edge thereof disposed at a lower level than the rails, a return idler assembly spanning the supports, flanges on the assembly engaging the sides of the slots in the plates, a troughing idler roller support spanning the rails, bolts for detachably connecting the troughing idler support to the rails and engaging the sides of key hole slots provided in the rails, said slots being large enough at one end to receive the bolt heads and small enough at the other end to engage said heads.

6. In an intermediate section of a sectional belt conveyor construction, a pair of parallel longitudinally extending rails having key hole slots in the upper surfaces thereof, a vertical support joined to one end of each rail and having a slot in the upper edge thereof, a pair of meeting rails each with a button head lug hooked into the slot of its associated support, a plate adjustable horizontally mounted on and forming a part of each support and having a slot in the upper edge thereof disposed at a lower level than the rails, a return idler assembly spanning the supports, flanges on the assembly engaging the sides of the slots in the plates, a troughing idler roller support spanning the rails, bolts for detachably connecting the troughing idler roller support to the rails and engaging the sides of key hole slots provided in the rails, said slots being large enough at one end to receive the bolt heads and small enough at the other end to engage said heads, and a deck supported by the rails between the troughing idler rollers and the return idler rollers.

7. A sectional belt conveyor frame construction comprising laterally opposed longitudinally extending rails having notched vertical supports secured at one end thereof and having button head lugs at the other end for attaching to the vertical supports of adjacent meeting rails, said vertical supports each having a slot therein for supporting a cross idler member and said rails having slots therein for detachably supporting other cross idler members.

8. Apparatus as defined in claim 7 in which the cross idler members comprise the only means to tie the opposed longitudinally extending rails to each other.

9. A sectional belt conveyor frame construction comprising laterally disposed vertical supports each having a section of a longitudinally extending rail fixedly secured thereto and each having a pair of vertically opening notches therein, a meeting rail having a button head lug detachably engaging in one of the notches, and a transversely extending idler roller having button heads at both ends which engage in the other notches of said vertical supports whereby to hold said vertical supports in transversely spaced relation.

GEO. W. BENJAMIN.

REFERENCES CITED

The following references are of record in the file of this patent:

UNITED STATES PATENTS

| Number | Name | Date |
| --- | --- | --- |
| 2,066,383 | Andrada | Jan. 5, 1937 |
| 2,074,804 | Nyborg | Mar. 23, 1937 |
| 2,105,889 | Madeira | Jan. 18, 1938 |
| 2,147,908 | Madeira | Feb. 21, 1939 |